US 7,399,446 B2
Jul. 15, 2008

(12) United States Patent
Herzog

(10) Patent No.: US 7,399,446 B2
(45) Date of Patent: Jul. 15, 2008

(54) APPARATUS AND PROCESS FOR LOCATING AND FOR MEASURING VARIATIONS IN TEMPERATURE AND/OR IN DEGREE OF FOULING OVER THE INTERNAL SURFACE OF EQUIPMENT

(75) Inventor: Marc Jacques Herzog, Sausset les Pins (FR)

(73) Assignee: Ineos Europe Limited, Hampshire (GB)

( * ) Notice: Subject to any disclaimer, the term of this patent is extended or adjusted under 35 U.S.C. 154(b) by 526 days.

(21) Appl. No.: 10/297,441

(22) PCT Filed: May 17, 2001

(86) PCT No.: PCT/GB01/02197

§ 371 (c)(1),
(2), (4) Date: Aug. 6, 2003

(87) PCT Pub. No.: WO01/94900

PCT Pub. Date: Dec. 13, 2001

(65) Prior Publication Data

US 2004/0037752 A1 Feb. 26, 2004

(30) Foreign Application Priority Data

Jun. 6, 2000 (FR) .................................. 00 07196

(51) Int. Cl.
*G01N 15/06* (2006.01)
*G01N 33/00* (2006.01)
*G01N 33/48* (2006.01)
*G01N 21/00* (2006.01)

(52) U.S. Cl. .................. 422/82.12; 422/50; 422/52; 422/56; 422/57; 422/68.1; 422/82.05; 422/82.06; 422/82.07; 422/82.09; 422/129; 436/43; 436/147; 436/164; 700/266; 702/1; 702/127; 702/130; 702/136

(58) Field of Classification Search .................. 422/50, 422/52, 55, 56, 57, 68.1, 82.05, 82.06, 82.07, 422/82.09, 82.12, 129; 436/43, 147, 164; 700/266; 702/1, 127, 130, 136
See application file for complete search history.

(56) References Cited

U.S. PATENT DOCUMENTS

| 4,508,461 A | * | 4/1985 | Lambert ...................... 374/161 |
| 5,547,545 A | | 8/1996 | Egi et al. |
| 5,775,808 A | * | 7/1998 | Pan ............................. 374/161 |
| 5,821,861 A | * | 10/1998 | Hartog et al. ............... 340/584 |

FOREIGN PATENT DOCUMENTS

| EP | 0 572 238 A1 | 12/1993 |
| JP | 4-74813 | 3/1992 |
| WO | WO 96/10735 | 4/1996 |

OTHER PUBLICATIONS

Hurtig, Eckart et al., Distributed Fiber Optics for Temperature Sensing in Buildings and other Structures, IEEE, pp. 1829-1834 (1998).

* cited by examiner

*Primary Examiner*—Brian J Sines
(74) *Attorney, Agent, or Firm*—Finnegan, Henderson, Farabow, Garrett and Dunner, L.L.P.

(57) ABSTRACT

The present invention relates to an apparatus and a process for locating and for measuring variations in temperature and/or in degree of fouling over the internal suface of equipment.

14 Claims, 3 Drawing Sheets

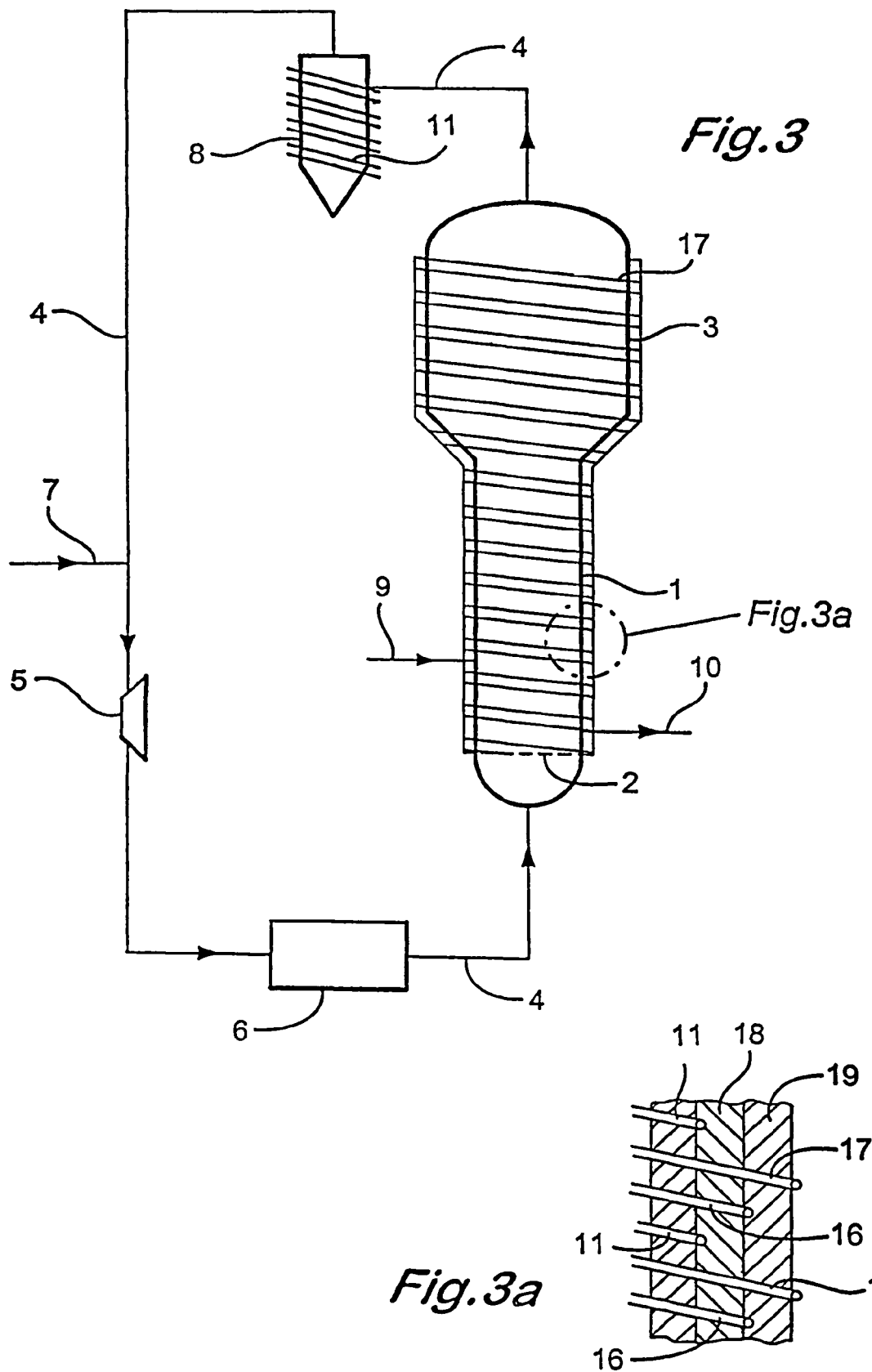

APPARATUS AND PROCESS FOR LOCATING AND FOR MEASURING VARIATIONS IN TEMPERATURE AND/OR IN DEGREE OF FOULING OVER THE INTERNAL SURFACE OF EQUIPMENT

The field of application of the apparatus of the present invention may encompass all processes for which it is desired to measure temperature and degree of fouling by a non-intrusive method.

The preferred field of application in which the device of the present invention has been employed is that of the manufacture of polymers in a fluidized-bed gas-phase polymerization reactor.

It is known to manufacture a polymer, especially a polyolefin, in a fluidized-bed apparatus. The apparatus essentially comprises a fluidized-bed reactor provided in its lower part with a fluidization grid and in its upper part with a disengagement region. It also includes a fluidizing-gas recycling loop provided with a compressor, with at least one heat exchanger, with one or more inlets for fresh feed gases and optionally with at least one cyclone used to reduce the entrainment of the fine particles with the fluidizing gases. The reactor is also provided with at least one inlet for a catalyst feed line and with at least one polymer discharge line.

It is known to control a process for manufacturing a polymer in a fluidized bed, and especially to control the temperature inside a fluidized-bed reactor, with the aid of temperature probes which pass through the walls of the reactor and penetrate into the fluidized bed. One drawback with these temperature probes is due to the fact that they disturb the flow of the fluidizing gas stream in the fluidized-bed reactor. Another drawback with these temperature probes stems from the fact that they have a tendency to become covered with polymer, falsifying the temperature measurement. These temperature probes also have a tendency to be weakened since they constitute adhering points or obstacles to the solids and agglomerates flowing along the reactor walls.

The latter remain important for other aspects of the polymerization process, such as the control of the temperature inside the reactor. One of the objectives of the present invention is to improve the control of the polymerization by increasing the temperature measurement points on the reactor walls so as to detect, in real time, any occurrence likely to prejudice the proper operation of the polymerization process, such as the presence of hot spots or of fouling on the internal surface of the reactor walls.

It is known to use temperature sensors, such as thermocouples, for detecting temperature variations at various points on an inner surface of the metal walls of a reactor. It is generally sufficient to attach these sensors so as to be in thermal contact with the outer surface of the reactor walls. This technique is useful for detecting phenomena whose occurrence is localized at the measurement points formed by these thermal sensors. However, to cover all the sensitive surfaces of the walls of a polymerization reactor, it would be necessary to install a very large number of sensors and the operation of such a plant could prove to be expensive and complicated.

Another known technique consists in using an optical fibre in thermal contact with the wall of a reactor and connected to a system suitable for measuring the temperature profile along the said fibre, thereby making it possible to know the temperature on any surface element covered by the said optical fibre. This technique has the advantage of avoiding having to drill holes into the reactor walls, this being necessary in order to fit the conventional temperature sensors.

Patent Application EP 0,572,238 describes a method of controlling the temperature of a blast furnace, which comprises the use of an optical fibre on the metal surface of the said blast furnace and the measurement of the temperature distribution over the surface covered by the optical fibre, the said measurement being based on the intensity of a Raman backscattering spectrum from a light pulse sent into the said optical fibre and over the time interval between the transmission of the light pulse and the return of the Raman backscattering spectrum to the emitting end of the said optical fibre.

Patent Application EP 0,731,906 describes a similar method of controlling the temperature of a reactor, in which method a length of optical fibre is placed in thermal contact with part of the reactor wall. A suitable system is used to measure the respective temperature for a succession of points along the said length of optical fibre.

The above two documents describe the use of a measurement device using an optical fibre and a device for measuring the temperature profile along this fibre. It is possible using these means to measure the temperature at various points on a surface covered by an optical fibre. This technique therefore seems to overcome the aforementioned drawbacks.

In the case of a fluidized-bed polymerization reactor, this technique can be used to determine the temperature at several points on the internal surface of the walls of the said reactor, by covering the external surface of the walls of the said reactor with an optical fibre connected to a temperature measurement system. However, the use of this technique has a number of problems.

One of the problems with this technique is that due to the measurement errors caused by the ambient temperature outside of the reactor walls. In the case of an industrial polymerization reactor, environmental effects, such as exposure to the sun and wind direction, can result in the temperature measurement being significantly disturbed. These measurement errors may be of the same order of magnitude as the temperature variations that it is desired to detect.

Fouling of the internal surface of the reactor walls may be another source of errors in the temperature measurement. This fouling constitutes a thermally insulating layer which tends to increase the difference between the temperatures on the internal surface and that measured on the external surface of the reactor walls. The errors due to this fouling problem can be not insignificant and of the same order of magnitude as the temperature variations that it is desired to measure.

Over and above the temperature measurement errors that occur as a result, the fouling of the internal surface of a polymerization reactor poses a real problem as it is. There is a real need to develop a non-intrusive technique for locating and measuring the thickness of deposits on the internal surface of the walls of a reactor.

The problem that it is desired to solve in a fluidized-bed gas-phase polymerization reactor may be extended to a large number of items of equipment, particularly equipment of the chemical-engineering type.

A non-intrusive technique has been found which makes it possible to locate and measure the thickness of fouling on the internal surface of the walls of an item of equipment. The same means can be used, alternatively or at the same time, to measure the temperature at various points on the internal surface of the walls of this same equipment, with the possibility of correcting the measurement of any variations caused by the external environment.

The present invention is an apparatus comprising an item of equipment made of material M1, the external surface of the walls of the said equipment being surrounded by, and in thermal contact with, at least one optical fibre F1, the said optical fibre being connected to a system for measuring the temperature profile along the said optical fibre F1, the said optical fibre F1 being covered with at least one layer i of material Mi, which apparatus is characterized in that the external surface of at least one layer i of material Mi covering the said optical fibre F1 is surrounded by, and in thermal contact with, at least one optical fibre Fi connected to a system for measuring the temperature profile along the said fibre Fi.

Figure 1:
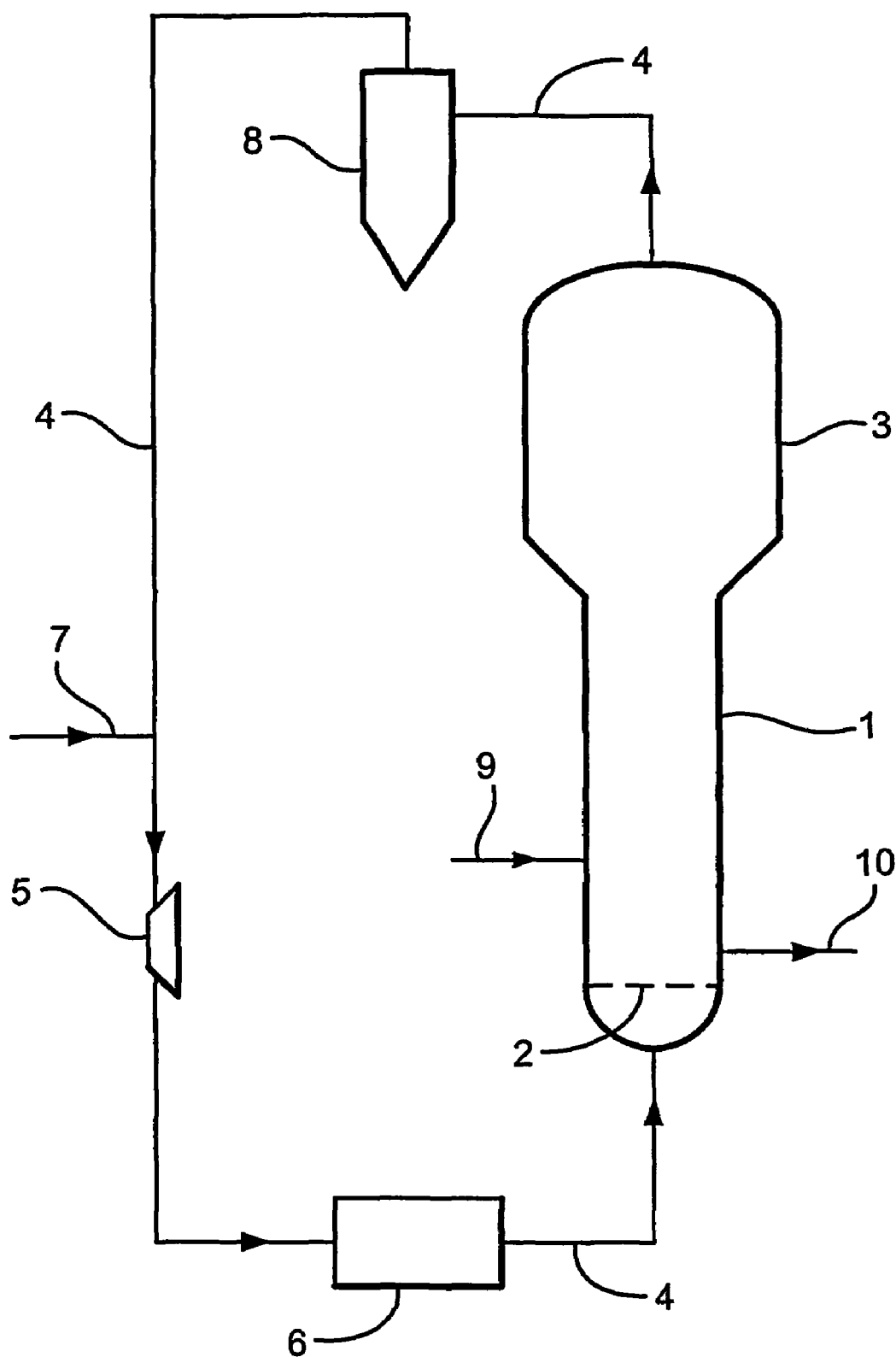
FIG. 1 shows schematically a fluidized-bed apparatus used for manufacturing a polymer, especially a polyolefin.

FIGS. 3 and 3.a show schematically one particular method of implementing the process according to the present invention.

The equipment to which the present invention refers may be chosen from apparatuses containing a reactive, preferably exothermic, mixture. The equipment of the present invention may also contain compounds, or products formed from these compounds, liable to be deposited on the internal surface of the walls of the said equipment. The equipment according to the present invention may be any apparatus containing at least one solid phase and/or at least one viscous liquid phase, such as, for example, a chemical reactor, a separator or an air-operated transport device. The chemical reactor may be a polymerization reactor, preferably a fluidized-bed polymerization reactor, especially a gas-phase fluidized-bed polymerization reactor. The separator may preferably be a cyclone.

The material M1 of the equipment is preferably a good thermal conductor so that the temperature on the external surface is as close as possible to the temperature on the internal surface of the said equipment The materials Mi may be thermal insulators or thermal conductors. The last layer surrounding the equipment is advantageously made of insulating material. The layers i of material Mi generally have known and preferably uniform thicknesses over the external surface of the walls of the said equipment The external surface of the walls of the equipment is surrounded by an optical fibre F1. By way of example, the optical fibre may be chosen from the optical fibres DTS 200®, DTS 400® and DTS 800® sold by York Sensors Limited (UK) and is used according to the method described in European Patent Application EP 0,731,906. It is preferred to use the optical fibre DTS 400® which has a sensitivity of 0.5° C. with a spatial resolving power of a 1 m length of fibre and a mean duration of 30 seconds. Alternatively, the optical fibres sold by BICC Thermoheat Corp. may be used.

In general, the term "optical fibre" may mean either a single optical fibre or an array of several optical fibres in series or in parallel. The expression "at least one optical fibre F1" can therefore refer to a single fibre or to an array of several fibres. This applies in the same way to the expression "at least one optical fibre Fi".

The external surface of the walls of the equipment is in thermal contact with the optical fibre F1 via any suitable means. Thermal contact should be understood to mean contact allowing effective heat transfer between the outer surface of the walls of the equipment and the optical fibre F1. The said optical fibre is preferably inserted into a protective metal tubing and attached to the external walls of the equipment by adhesive bonding or mechanical fastening. The said optical fibre or the protective metal tubing surrounding the said optical fibre is preferably adhesively bonded using a cement or an adhesive having a very high thermal conductivity.

The optical fibre F1 is connected to a system for measuring the temperature profile along the said optical fibre. The principle of the measurement system is preferably based on Raman spectroscopy of a light pulse and on the influence of the temperature on the light absorption. Preferably, the method used by the measurement system essentially consists in sending a laser light pulse to the end of an optical fibre and in measuring, at this same end, the intensity and the time interval elapsed between emission and reception of the reflected signals of this laser light pulse at any point on the said fibre. After digital processing, the intensity variations and the acquisition times of the reflected signals make it possible to record any change in the temperature at any point on the fibre and to translate these into the form of a detailed temperature profile along the fibre. This temperature profile then makes it possible to identify, in real time, the regions on the internal surface of the walls of the equipment covered by the optical fibre where temperature variations occur.

The temperature profile measured along the optical fibre is generally a discontinuous profile, that is to say consisting of a series of temperatures, each of them corresponding to a finite element of the said optical fibre. For any elementary part of the optical fibre, an elementary temperature is measured with a certain sensitivity. In the case of a DTS 400® optical fibre, the sensitivity is 0.5° C. The length of an elementary part, or elementary length, is equal to the spatial resolution of the optical fibre. In the case of a DTS 400® optical fibre, the elementary length is 1 m. It is possible to associate, with each elementary part of the optical fibre, a surface element corresponding to the external surface of the walls of the equipment covered with the elementary part of the said optical fibre. A surface element generally has a minimum surface area related to the amount of space taken up by and the flexibility of the optical fibre and/or of the protective metal tubing surrounding the said optical fibre.

The optical fibre F1 may be arranged over the external surface of the walls of the equipment by taking the elementary length of the said optical fibre into account. The optical fibre F1 may be arranged on the external surface of the walls of an item of equipment in various arrangements. By way of example, the following arrangements may be envisaged:

a helical coil around the equipment with a pitch chosen according to the resolving power of the fibre and to the region of the said equipment where it is desired to measure the temperature;

a succession of spiralled coils, each coil covering a sensitive region of the walls of the equipment.

The optical fibre F1 may advantageously be arranged in a succession of spiralled coils, each coil having a length equal to the elementary length of the optical fibre and covering an elementary area of the external surface of the walls of the equipment.

The measurement system may be provided with a device for alternately adding and removing, intermittently, an additional length of optical fibre preferably corresponding to a fraction of the elementary length of the said optical fibre. This device, described in Patent Application EP 0,572,238, makes it possible to obtain, in succession, two temperature profiles for elementary parts of the optical fibre which are offset from one profile to the other. Combining the two temperature profiles, for example by averaging the temperatures obtained, makes it possible to obtain a resultant temperature profile having smaller elementary parts than the elementary parts of the two initial profiles, thereby artificially improving the spatial resolution of the optical fibre. The additional length of optical fibre, alternately added and removed, preferably corresponds to half the elementary length of the said optical fibre. This makes it possible to obtain a resultant temperature profile having equivalent elementary parts of length equal to half the spatial resolution of the optical fibre, which amounts to doubling the resolving power of the optical fibre.

According to the present invention, the external surface of the layer i of material Mi covering the equipment is surrounded by, and is in thermal contact with, at least one optical fibre Fi. Thermal contact should be understood to mean contact allowing effective heat transfer between the external surface of the layer i of material Mi and the optical fibre Fi. The optical fibre Fi may be placed around and attached to the external surface of the layer of material Mi in the same way that the optical fibre F1 is placed on and attached to the external surface of the walls of the equipment made of material M1. The characteristics of the optical fibre Fi may preferably be similar to the optical fibre F1.

According to a preferred embodiment of the present invention, the optical fibre Fi is connected to a system for measuring the temperature profile along the said fibre. The measurement system for the optical fibre Fi may preferably be similar to that for the optical fibre F1. It is possible to envisage a single measurement system which is connected to the optical fibres F1 and Fi and is used alternately for each of the optical fibres.

The optical fibre Fi, placed around the layer of material Mi, and the associated temperature measurement system make it possible to measure, in real time, the temperature at the surface of the said layer of material Mi at several points simultaneously.

The use of the optical fibre Fi also makes it possible to locate, and measure the thickness of, fouling inside an item of equipment. The two temperature profiles measured by the optical fibres F1 and Fi, for several points on the walls of the equipment, covered with the said optical fibres, make it possible to determine the temperature between the external surface of the walls of the equipment and the external surface of the layer i of material Mi. It is thus possible to calculate the heat flux through these various layers, and to do so at several points on the walls of the equipment. For this calculation, all the other intermediate insulating layers, such as the paint and the cable protecting the optical fibres, may possibly be taken into account. The calculation of the heat flux, $\phi$, is carried out at several points on the walls of the equipment covered with the optical fibres F1 and Fi, using:

i) the thermal conductivity, Cth, of the materials between the first layer and the layer i of material Mi and possibly of the other insulting layers,
ii) the thickness, Ei, between the first layer and the layer i of material Mi and possibly of the other intermediate insulating layers, and
iii) the temperature difference, Dti, measured by the optical fibres F1 and Fi.

The calculation of the heat flux may be carried out with the aid of the following formula:

$$\phi = Cth * Ei * DTi$$

One particular method of implementing the invention is to place an optical fibre Fi on the last layer of the equipment. In this case, the optical fibre Fi is exposed to the influence of the external conditions. It is thus possible to correct the temperatures which are measured by the optical fibre F1 of any disturbance from the external environment which is measured by the optical fibre Fi. By this means, the temperature variations measured on the optical fibre F1, corrected by the measurements on the optical fibre Fi, are directly correlated to the phenomena taking place on the internal surface of the walls of the equipment.

Another particular method of implementing the present invention allowing the layers i of material Mi to be removed during maintenance work consists in placing the optical fibre Fi only at certain points on the equipment, for example around the circumference at 3 or 4 different heights.

Yet another particular method of implementing the present invention consists in placing an optical fibre F2 on a first layer 2 of thermally conducting material M2 and another optical fibre Fi (i>2) on a layer i (i>2) of thermally insulating material Mi (i>2). Preferably, the other fibre is a fibre F3 on a second layer 3 of insulating material M3. In particular, it may be envisaged that the layer 3 is the last layer covering the equipment. This method of implementation makes it possible to calculate the heat flux through the layer 2 and therefore to determine the thickness of any deposits, while at the same time getting around the problem of the effects due to variation in the temperature on the external layer covering the equipment.

The invention also relates to a process for manufacturing a polymer, especially a polyolefin, in a fluidized-bed apparatus essentially comprising a fluidized-bed reactor (1) provided in its lower part with a fluidization grid (2), preferably in its upper part with a disengagement region (3), with at least one inlet for a catalyst feed line (9) and with at least one polymer discharge line (10), and also including a fluidizing-gas recycling loop (4) provided with a compressor (5), with at least one heat exchanger (6), with one or more inlets (7) for fresh feed gases and optionally with at least one cyclone (8) used to reduce the entrainment of the fine particles with the fluidizing gases, which process is characterized in that i) a temperature profile is measured along an optical fibre F1 surrounding, and in thermal contact with, at least one part of the external surface of the walls of the fluidized-bed apparatus, the said optical fibre F1 being, at least partly, covered with at least one layer i of material Mi, and in that
ii) one or more temperature profiles are measured along at least one optical fibre Fi surrounding, and in thermal contact with, at least one part of the external surface of the layer i of material Mi.

Figure 2:
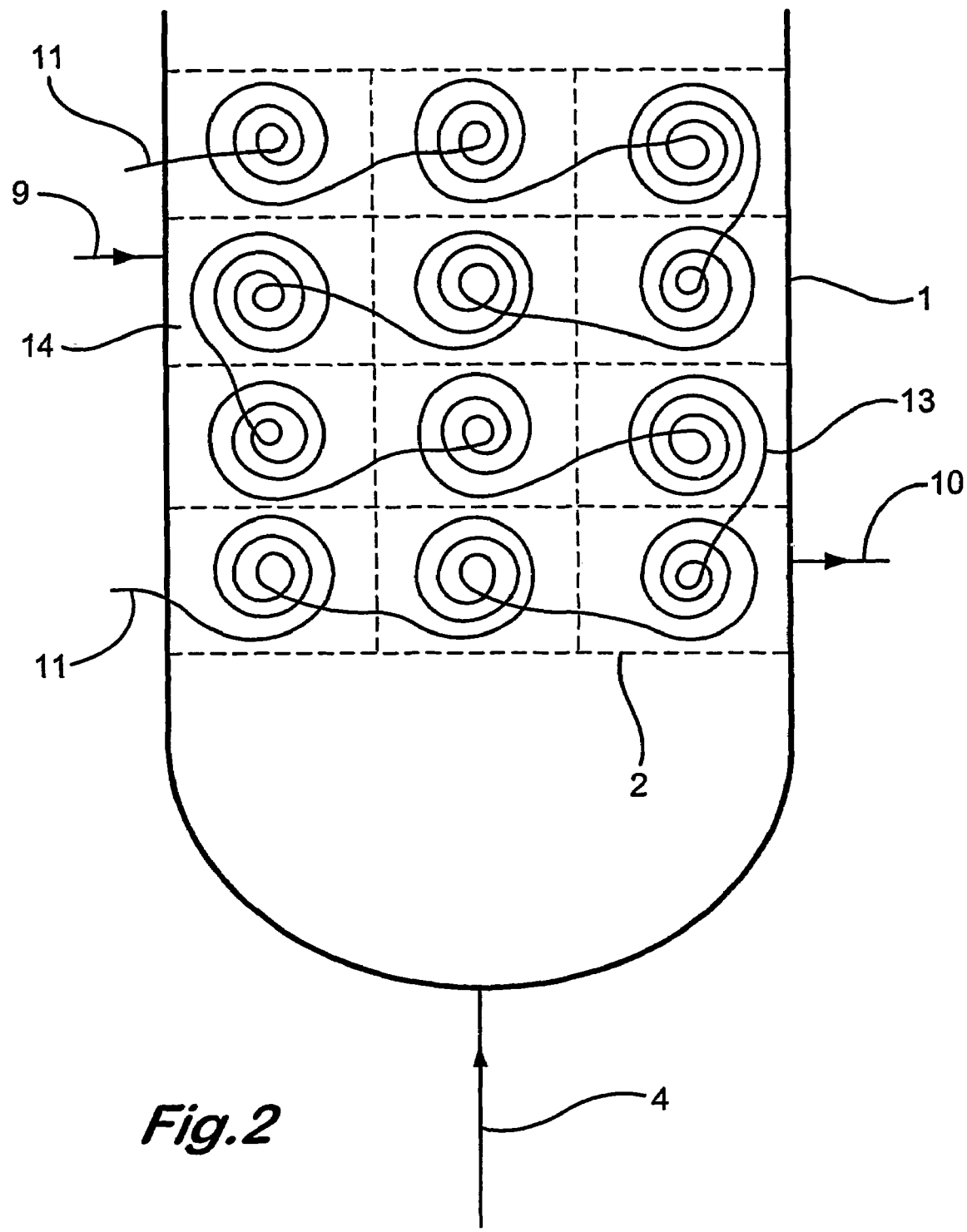
FIG. 2 shows schematically one particular arrangement of an optical fibre on the external surface of the walls of an item of equipment, or on the layers i of material Mi covering the said equipment.

The optical fibre (11) may be arranged on the external surface of the wall of the fluidized-bed apparatus in various arrangements, as shown in FIGS. 2 and 3:

either as a helical coil (12) around the fluidized-bed apparatus with a pitch chosen according to the resolving power of the fibre and to the region of the said apparatus where it is desired to monitor the temperature (see FIG. 3);

or as a succession of spiraled coils (13), each coil covering, for example, a 300×500 mm region (14) of the wall of the fluidized-bed apparatus, in an arrangement as described in FIG. 3.

The optical fibre Fi may be arranged on the outside of the layer of material Mi in various ways, for examples in accordance with the arrangement indicated in FIG. 2.

In a process for manufacturing a polymer such as a polyolefin (for example, a high-density or linear low-density polyethylene, or a polypropylene), it is preferred to place at least one optical fibre on all or some of the external walls of the fluidized-bed apparatus, in particular:

the fluidized-bed reactor (1), especially the cylindrical shaft of the reactor, particularly above the fluidization grid (2), for example over a height of between 1 and 3 m above the said grid, or the region where the catalyst feed line (9) enters, or else the disengagement region (3), or the bottom of the reactor lying beneath the grid (2);

the cyclone (8), especially in its lower part where the fine particles accumulate before being entrained out of the cyclone and being, preferably, reintroduced into the reactor (1);

the heat exchanger (6), especially in its inlet or outlet wind box;

any portion of the recycling loop where particles or a readily volatile liquid may be deposited;

optionally, a gas/liquid separator as described in Patent Application WO 94/28032, so as to monitor the amount of condensed liquid and/or the rate of condensed liquid returned to the reactor (1).

The process of the present invention makes it possible to detect the presence of fouling, of hot spots or of cold spots at any point on the internal surface of the apparatus.

A first simplifying approach consists in assuming that the external perturbations are negligible, or else that the temperature measured at the optical fibre Fi is uniform at every point on the external surface of the layer i. A variation in the heat flux at a given point on the equipment walls may be explained either by the presence of a deposit of material or by a temperature variation on the internal surface of the equipment walls, or else by a combination of the two phenomena.

To distinguish a deposit of material from a temperature variation on the internal surface of the equipment walls, it may be assumed that the heat flux is constant at any point on the equipment walls. This assumption may be regarded as being valid if the stirring in the equipment is effective and if the polymerization reaction is stable, that is to say there is no hot spot. Alternatively, the phenomena may be distinguished, automatically and in real time, by digital processing, by an expert system and/or by a suitable arrangement comprising at least two levels of optical fibres.

In another approach, a variation in the heat flux at a given point on the equipment walls may be explained by the presence of a deposit of insulating material, by a temperature variation on the external surface of the equipment walls, by a temperature variation on the internal surface of the equipment walls and/or by a deposit of material on the said internal surface of the equipment walls. Once again, the phenomena may be distinguished, automatically and in real time, by a digital processing tool, by an expert system and/or by a suitable arrangement comprising at least three levels of optical fibres.

This process may be combined with a corrective action being taken by appropriate physical or chemical means for the purpose of eliminating or reducing the temperature variation.

The process of the present invention comprises, in response to a temperature variation thus observed at one or more points on the fluidized-bed apparatus, a corrective action to reduce or eliminate this variation. In particular, when it is a hot spot which is detected, the corrective action is preferably taken before a temperature equivalent to the sintering temperature of the polymer is reached, with a safety margin, for example, of 5° C. below the sintering temperature. The corrective action may employ any physical or chemical means. Among the physical means, mention may be made of:

lowering the polymerization temperature;
lowering the monomer partial pressure;
increasing the partial pressure of an inert gas;
vibrating a wall of the fluidized-bed apparatus; and
increasing the rate of introduction of a readily volatile liquid. Among the chemical means, mention may be made of:
introducing a polymerization poison or increasing the rate of introduction (for example according to European Patent EP 0,359,444);

lowering the rate of introduction of an activator or of a cocatalyst (for example according to European Patent EP 0,376,559);

lowering the rate of introduction of the catalyst; and introducing an antistatic compound (e.g. according to EP229368 or WO00/68274).

The process of the present invention has the advantage of being able to detect simultaneously and in real time, at several points on the fluidized-bed apparatus, both hot spots causing agglomerates of molten polymer to form and cold spots corresponding either to stagnant regions where there is no fluidization or to uncontrolled accumulation of condensable liquid. These anomalies are detected non-intrusively and do not in any way disrupt the process. Moreover, the corrective action may be initiated just as soon as the anomaly has been identified.

In addition, the temperature measurement carried out by means of the external optical fibre makes it possible to take into account any influence of the meteorological conditions and therefore to detect, even more precisely, the thermal phenomena which occur in the fluidized-bed apparatus.

FIG. 1 shows schematically a fluidized-bed apparatus used for manufacturing a polymer, especially a polyolefin. The apparatus essentially comprises a fluidized-bed reactor (1) provided in its lower part with a fluidization grid (2) and in its upper part with a disengagement region (3). It also includes a fluidizing-gas recycling loop (4) provided with a compressor (5), with at least one heat exchanger (6), with one or more inlets (7) for fresh feed gases and optionally with at least one cyclone (8) used to reduce the entrainment of the fine particles with the fluidizing gases. The reactor (1) is also provided with at least one inlet for a catalyst feed line (9) and with at least one polymer discharge line (10).

FIG. 2 shows schematically one particular arrangement of an optical fibre on the external surface of the walls of an item of equipment. The equipment shown is a fluidized-bed reactor (1) provided in its lower part with a fluidization grid (2), which also includes (shown partially) a recycling loop (4), an inlet for a catalyst feed line (9) and at least one polymer discharge line (10). The arrangement of the optical fibre F1 (11) is a succession of spiraled coils (13), each coil covering a region (14) of the external surface of the walls of the fluidized-bed reactor.

FIGS. 3 and 3a show schematically another particular method of implementing the process according to the invention. The fluidized-bed apparatus comprises the elements (1) to (10) described above in FIG. 1. The reactor (1) is equipped with an optical fibre F1 (11), which also covers the cyclone (8), and with two optical fibres, F2 (16) and F3 (17), placed on the layers 2 and 3, (18) and (19) respectively, of materials M2 and M3.

The invention claimed is:

1. Apparatus comprising an item of equipment made of material M1 having external walls, an outer surface of the walls of the equipment being surrounded by, and in thermal contact with, at least one optical fibre F1, the optical fibre being connected to a system for measuring a temperature profile along the optical fibre F1, at least one layer i of material Mi of thermally insulating material separate from and covering the optical fibre F1 and the outer surface of the walls of the equipment in the region where the optical fibre F1 is located, wherein an external surface of the at least one layer i of material Mi covering the optical fibre F1 is surrounded by, and in thermal contact with, at least one optical fibre Fi connected to a system for measuring a temperature profile along the optical fibre Fi.

2. Apparatus according to claim 1, wherein the equipment made of material M1 is a chemical reactor, a separator or an air-operated transport device.

3. Apparatus according to claim 2, wherein the equipment made of material M1 is a chemical polymerization reactor.

4. The apparatus of claim 3, wherein the reactor is a fluidized-bed polymerization reactor.

5. The apparatus of claim 4, wherein the reactor is a gas-phase fluidized-bed polymerization reactor.

6. Apparatus according to claim 1, wherein an outermost layer of material surrounding the equipment is layer i made of thermally insulating material Mi.

7. Apparatus according to claim 1, wherein the optical fibre F1 is arranged in a succession of spiraled coils, each coil covering a sensitive region of the outer surface of the walls of the equipment.

8. Apparatus according to claim 1, wherein the optical fibre F1 is arranged in a helical coil around the outer surface of the walls of the equipment with a pitch chosen according to a resolving power of the fibre and to a region of the equipment where it is desired to measure the temperature.

9. Apparatus according to claim 8, wherein each coil has a length equal to an elementary length of the optical fibre F1 and covers an elementary area of the outer surface of the walls of the equipment.

10. Apparatus according to claim 7 or 8, wherein the optical fibre Fi is placed on and attached to the external surface of the layer i of material Mi in the same way that the optical fibre F1 is arranged on and attached to the outer surface of the walls of the equipment made of material M1.

11. Apparatus according to claim 7 or 8, wherein the optical fibre Fi is placed on layer i only at certain points on the equipment.

12. The apparatus of claim 11, wherein the optical fibre Fi is placed on layer i and around the circumference of the equipment at 3 or 4 different heights.

13. Apparatus according to claim 7 or 8, which includes a layer of thermally conducting material M2 in the region where the optical fibre F1 is located that is surrounded on an outer surface by, and in thermal contact with, at least one optical fibre F2, said material M2 and optical fibre F2 being located between said optical fibre F1 and layer i of thermally insulating material Mi.

14. Apparatus according to claim 13 wherein an outermost layer of material surrounding the equipment is layer i made of thermally insulating material Mi.

* * * * *